US006393381B1

(12) United States Patent
Williams et al.

(10) Patent No.: US 6,393,381 B1
(45) Date of Patent: May 21, 2002

(54) LAMP MONITORING AND CONTROL UNIT AND METHOD

(75) Inventors: Larry Williams, Los Angeles, CA (US); Michael F. Young, Falls Church, VA (US); Hunter V. Jones, Silver Spring, MD (US)

(73) Assignee: A.L. Air Data, Inc., Los Angeles, CA (US)

( * ) Notice: Subject to any disclaimer, the term of this patent is extended or adjusted under 35 U.S.C. 154(b) by 0 days.

(21) Appl. No.: 09/501,274

(22) Filed: Feb. 9, 2000

Related U.S. Application Data

(62) Division of application No. 08/838,302, filed on Apr. 16, 1997, now Pat. No. 6,119,076.

(51) Int. Cl.[7] ............................................ H04L 29/02

(52) U.S. Cl. ................. 702/188; 340/870.16; 315/149; 315/307

(58) Field of Search .................. 702/188, 57; 315/129, 315/133, 134, 149, 307; 340/870.01, 870.07, 870.16, 825.06; 455/422, 403, 423, 73

(56) References Cited

U.S. PATENT DOCUMENTS

| | | | | |
|---|---|---|---|---|
| 3,584,222 A | | 6/1971 | Nesbitt | 250/214 |
| 3,727,063 A | | 4/1973 | Turner | 250/206 |
| 3,828,334 A | | 8/1974 | Wallace | 340/251 |
| 3,900,763 A | | 8/1975 | Turner | 315/156 |
| 4,008,415 A | | 2/1977 | De Avila-Serafin et al. | 315/156 |
| 4,406,995 A | | 9/1983 | May | 340/539 |
| 4,479,246 A | | 10/1984 | Young | |
| 4,580,099 A | | 4/1986 | Zetti | 324/414 |
| 4,614,945 A | | 9/1986 | Brunius et al. | 340/870.03 |
| 4,661,821 A | * | 4/1987 | Smith | 343/743 |
| 4,665,321 A | | 5/1987 | Chang et al. | 307/10 |
| 4,691,341 A | | 9/1987 | Knoble et al. | 379/97 |
| 4,718,079 A | | 1/1988 | Rabito | 379/2 |
| 4,808,982 A | | 2/1989 | Knapp | 340/641 |
| 4,810,936 A | | 3/1989 | Nuckolls et al. | 315/119 |
| 4,939,505 A | | 7/1990 | Cappellini et al. | 340/642 |
| 5,095,502 A | | 3/1992 | Finzel | 379/40 |
| 5,132,596 A | | 7/1992 | Walters et al. | 315/159 |
| 5,194,860 A | | 3/1993 | Jones et al. | 340/370.02 |
| 5,195,016 A | | 3/1993 | Powers | 361/175 |
| 5,397,963 A | | 3/1995 | Manson | 315/129 |
| 5,471,119 A | * | 11/1995 | Ranganath et al. | 315/307 |

(List continued on next page.)

FOREIGN PATENT DOCUMENTS

| | | | |
|---|---|---|---|
| EP | 91870118.6 | 2/1992 | H05B/37/03 |
| GB | 8515144 | 12/1986 | G08B/19/00 |
| KR | 9409501 | 10/1994 | H05B/37/02 |
| WO | WO 90/04242 | 4/1990 | G08G/5/00 |

OTHER PUBLICATIONS

Echelon Corp., "Networking Control", IEEE, 1992.*

Echelon Corp., "Determinism in Industrial ComputerControl Network Applications", IEEE, Jan. 1995.*

*Primary Examiner*—Patrick Assouad
(74) *Attorney, Agent, or Firm*—Fleshner & Kim, LLP

(57) ABSTRACT

A unit and method for remotely monitoring and/or controlling an apparatus and specifically for remotely monitoring and/or controlling street lamps. The lamp monitoring and control unit comprises a processing and sensing unit for sensing at least one lamp parameter of an associated lamp, and for processing the lamp parameter to monitor and control the associated lamp by outputting monitoring data and control information, and a transmit unit for transmitting the monitoring data, representing the at least one lamp parameter, from the processing and sensing unit. The method for monitoring and controlling a lamp comprises the steps of: sensing at least one lamp parameter of an associated lamp; processing the at least one lamp parameter to produce monitoring data and control information; transmitting the monitoring data; and applying the control information.

61 Claims, 15 Drawing Sheets

U.S. PATENT DOCUMENTS

| | | | | | |
|---|---|---|---|---|---|
| 5,479,159 | A | | 12/1995 | Kelly et al. | 340/825.08 |
| 5,487,088 | A | | 1/1996 | Weltz et al. | 315/276 |
| 5,586,050 | A | | 12/1996 | Makel et al. | 364/509 |
| 5,598,456 | A | | 1/1997 | Feinberg | 379/42 |
| 5,668,537 | A | | 9/1997 | Chansky et al. | 340/625.06 |
| 5,739,640 | A | | 4/1998 | Noble | 315/119 |
| 5,748,104 | A | | 5/1998 | Argyroudis et al. | 340/870.11 |
| 5,760,706 | A | * | 6/1998 | Kiss | 340/825.69 |
| 5,898,384 | A | * | 4/1999 | Alt et al. | 340/825.36 |
| 5,962,991 | A | * | 10/1999 | Levy | 315/312 |
| 6,028,396 | A | * | 2/2000 | Morissey, Jr. et al. | 315/119 |
| 6,035,266 | A | * | 3/2000 | Williams et al. | 702/188 |

* cited by examiner

High-pressure mercury-vapor lamp

IVDS RADIO CHANNELS

| CHANNEL | FREQUENCY (GROUP A) | FREQUENCY (GROUP B) |
|---|---|---|
| 1 | 218.025 | 218.525 |
| 2 | 218.050 | 218.550 |
| 3 | 218.075 | 218.575 |
| 4 | 218.100 | 218.600 |
| 5 | 218.125 | 218.625 |
| 6 | 218.150 | 218.650 |
| 7 | 218.175 | 218.675 |
| 8 | 218.200 | 218.700 |
| 9 | 218.225 | 218.725 |
| 10 | 218.250 | 218.750 |
| 11 | 218.275 | 218.775 |
| 12 | 218.300 | 218.800 |
| 13 | 218.325 | 218.825 |
| 14 | 218.350 | 218.850 |
| 15 | 218.375 | 218.875 |
| 16 | 218.400 | 218.900 |
| 17 | 218.425 | 218.925 |
| 18 | 218.450 | 218.950 |
| 19 | 218.475 | 218.975 |

FIG. 8

C1 tunes for resonance

C2 matches input to 50 ohms

LAMP MONITORING AND CONTROL UNIT AND METHOD

This application is a divisional of application Ser. No. 08/838,302 filed Apr. 16, 1997 now U.S. Pat. No. 6,119,076.

BACKGROUND OF THE INVENTION

1. Field of the Invention

This invention relates generally to a unit and method for remotely monitoring and/or controlling an apparatus and specifically to a lamp monitor and control unit and method for use with street lamps.

2. Background of the Related Art

The first street lamps were used in Europe during the latter half of the seventeenth century. These lamps consisted of lanterns which were attached to cables strung across the street so that the lantern hung over the center of the street. In France, the police were responsible for operating and maintaining these original street lamps while in England contractors were hired for street lamp operation and maintenance. In all instances, the operation and maintenance of street lamps was considered a government function.

The operation and maintenance of street lamps, or more generally any units which are distributed over a large geographic area, can be divided into two tasks: monitor and control. Monitoring comprises the transmission of information from the distributed unit regarding the unit's status and controlling comprises the reception of information by the distributed unit.

For the present example in which the distributed units are street lamps, the monitoring function comprises periodic checks of the street lamps to determine if they are functioning properly. The controlling function comprises turning the street lamps on at night and off during the day.

This monitor and control function of the early street lamps was very labor intensive since each street lamp had to be individually lit (controlled) and watched for any problems (monitored). Because these early street lamps were simply lanterns, there was no centralized mechanism for monitor and control and both of these functions were distributed at each of the street lamps.

Eventually, the street lamps were moved from the cables hanging over the street to poles which were mounted at the side of the street. Additionally, the primitive lanterns were replaced with oil lamps.

The oil lamps were a substantial improvement over the original lanterns because they produced a much brighter light. This resulted in illumination of a greater area by each street lamp. Unfortunately, these street lamps still had the same problem as the original lanterns in that there was no centralized monitor and control mechanism to light the street lamps at night and watch for problems.

In the 1840's, the oil lamps were replaced by gaslights in France. The advent of this new technology began a government centralization of a portion of the control function for street lighting since the gas for the lights was supplied from a central location.

In the 1880's, the gaslights were replaced with electrical lamps. The electrical power for these street lamps was again provided from a central location. With the advent of electrical street lamps, the government finally had a centralized method for controlling the lamps by controlling the source of electrical power.

The early electrical street lamps were composed of arc lamps in which the illumination was produced by an arc of electricity flowing between two electrodes.

Currently, most street lamps still use arc lamps for illumination. The mercury-vapor lamp is the most common form of street lamp in use today. In this type of lamp, the illumination is produced by an arc which takes place in a mercury vapor.

FIG. 1 shows the configuration of a typical mercury-vapor lamp. This figure is provided only for demonstration purposes since there are a variety of different types of mercury-vapor lamps.

The mercury-vapor lamp consists of an arc tube 110 which is filled with argon gas and a small amount of pure mercury. Arc tube 110 is mounted inside a large outer bulb 120 which encloses and protects the arc tube. Additionally, the outer bulb may be coated with phosphors to improve the color of the light emitted and reduce the ultraviolet radiation emitted. Mounting of arc tube 110 inside outer bulb 120 may be accomplished with an arc tube mount support 130 on the top and a stem 140 on the bottom.

Main electrodes 150*a* and 150*b*, with opposite polarities, are mechanically sealed at both ends of the arc tube. The mercury-vapor lamp requires a sizeable voltage to start the arc between main electrodes 150*a* and 150*b*.

The starting of the mercury-vapor lamp is controlled by a starting circuit (not shown in FIG. 1) which is attached between the power source (not shown in FIG. 1) and the lamp. Unfortunately, there is no standard starting circuit for mercury-vapor lamps. After the lamp is started, the lamp current will continue to increase unless the starting circuit provides some means for limiting the current. Typically, the lamp current is limited by a resistor, which severely reduces the efficiency of the circuit, or by a magnetic device, such as a choke or a transformer, called a ballast.

During the starting operation, electrons move through a starting resistor 160 to a starting electrode 170 and across a short gap between starting electrode 170 and main electrode 150*b* of opposite polarity. The electrons cause ionization of some of the Argon gas in the arc tube. The ionized gas diffuses until a main arc develops between the two opposite polarity main electrodes. The heat from the main arc vaporizes the mercury droplets to produce ionized current carriers. As the lamp current increases, the ballast acts to limit the current and reduce the supply voltage to maintain stable operation and extinguish the glow between main electrode 150*b* and starting electrode 170.

Because of the variety of different types of starter circuits, it is virtually impossible to characterize the current and voltage characteristics of the mercury-vapor lamp. In fact, the mercury-vapor lamp may require minutes of warm-up before light is emitted. Additionally, if power is lost, the lamp must cool and the mercury pressure must decrease before the starting arc can start again.

The mercury-vapor lamp has become the predominant street lamp with millions of units produced annually. The current installed base of these street lamps is also enormous with more than 500,000 street lamps in Los Angeles alone. The mercury-vapor lamp is not the most efficient gaseous discharge lamp, but is preferred for use in street lamps because of its long life, reliable performance, and relatively low cost.

FIG. 2 shows a lamp arrangement 201 with a typical lamp control unit 210 which is situated between a power source 220 and a lamp assembly 230. The lamp assembly 230 may contain a lamp 240 (such as the mercury-vapor lamp presented in FIG. 1) and a starting circuit 250.

Most cities currently use automatic lamp control units to control the street lamps. These lamp control units provide an automatic, but decentralized, control mechanism for turning the street lamps on at night and off during the day.

A typical street lamp assembly 301 includes a lamp sensor unit 210 which in turn includes a light sensor 260 and a relay 270 as shown in FIG. 2. Lamp sensor unit 210 is electrically coupled between external power source 220 and starting circuit 250 of lamp assembly 230. There is a hot line 280*a* and a neutral line 280*b* providing electrical connection between power source 220 and lamp control unit 210. Additionally, there is a switched line 280*c* and a neutral line 280*d* providing electrical connection between lamp control unit 210 and starting circuit 250 of lamp assembly 230.

Prom a physical standpoint, most lamp control units 210 use a standard three prong plug to connect to the back of lamp assembly 230. The three prongs couple to hot line 280*a,* switched line 280*c,* and neutral lines 280*b* and 280*d.* In other words, the neutral lines 280*b* and 280*d* are both connected to the same physical prong since they are at the same electrical potential. Some systems also have a ground wire, but no ground wire is shown in FIG. 2 since it is not relevant to the operation of lamp control unit 210.

The power source 220 may be a standard 115 Volt, 60 Hz source from a power line. Of course, a variety of alternatives are available for power source 220. In foreign countries, power source 220 may be a 220 Volt, 50 Hz source from a power line. Additionally, power source 220 may be a DC voltage source or, in certain remote regions, it may be a battery which is charged by a solar reflector.

The operation of lamp control unit 210 is fairly simple. At sunset, when the light from the sun decreases below a sunset threshold, the light sensor 260 detects this condition and causes relay 270 to close. Closure of relay 270 results in electrical connection of the hot 280*a* and switched 280*c* lines with power being applied to starting circuit 250 of lamp assembly 230 to ultimately produce light from lamp 240. At sunrise, when the light from the sun increases above a sunrise threshold, the light sensor 260 detects this condition and causes relay 270 to open. Opening of relay 270 eliminates electrical connection between hot 280*a* and switched 280*c* lines and causes the removal of power from starting circuit 250 which turns lamp 240 off.

Lamp control unit 210 provides an automated, distributed control mechanism to turn lamp assembly 230 on and off. Unfortunately, it provides no mechanism for centralized monitoring of the street lamp to determine if the lamp is functioning properly. This problem is particularly important in regard to the street lamps on major boulevards and highways in large cities. When a street lamp burns out over a highway, it is often not replaced for a long period of time because the maintenance crew will only schedule a replacement lamp when someone calls the city maintenance department and identifies the exact pole location of the bad lamp. Since most automobile drivers will not stop on the highway just to report a bad street lamp, a bad lamp may go unreported indefinitely.

Additionally, if a lamp is producing light but has a hidden problem, visual monitoring of the lamp will never be able to detect the problem. Some examples of hidden problems relate to current, when the lamp is drawing significantly more current than is normal, or voltage, when the power supply is not supplying the appropriate voltage level to the street lamp.

Furthermore, the present system of lamp control in which an individual light sensor is located at each street lamp, is a distributed control system which does not allow for centralized control. For example, if the city wanted to turn on all of the street lamps in a certain area at a certain time, this could not be done because of the distributed nature of the present lamp control circuits.

Because of these limitations, a new type of lamp control unit is needed which allows centralized monitoring and/or control of the street lamps in a geographical area.

One attempt to produce a centralized control mechanism is a product called the RadioSwitch made by Cetronic. The RadioSwitch is a remotely controlled time switch for installation on the DIN-bar of control units. It is used for remote control of electrical equipment via local or national paging networks. Unfortunately, the RadioSwitch is unable to address most of the problems listed above.

Since the RadioSwitch is receive only (no transmit capability), it only allows one to remotely control external equipment. Furthermore, since the communication link for the RadioSwitch is via paging networks, it is unable to operate in areas in which paging does not exist (for example, large rural areas in the United States). Additionally, although the RadioSwitch can be used to control street lamps, it does not use the standard three prong interface used by the present lamp control units. Accordingly, installation is difficult because it cannot be used as a plug-in replacement for the current lamp control units.

Because of these limitations of the available equipment, there exists a need for a new type of lamp control unit which allows centralized monitoring and/or control of the street lamps in a geographical area. More specifically, this new device must be inexpensive, reliable, and easy to install in place of the millions of currently installed lamp control units.

Although the above discussion has presented street lamps as an example, there is a more general need for a new type of monitoring and control unit which allows centralized monitoring and/or control of units distributed over a large geographical area.

The above references are incorporated by reference herein where appropriate for appropriate teachings of additional or alternative details, features and/or technical background.

SUMMARY OF THE INVENTION

The present invention provides a lamp monitor and control unit and method for use with street lamps which solves the problems described above.

While the invention is described with respect to use with street lamps, it is more generally applicable to any application requiring centralized monitoring and/or control of units distributed over a large geographical area.

These and other objects, advantages and features can be accomplished in accordance with the present invention by the provision of a lamp monitoring and control unit comprising: a processing and sensing, unit for sensing at least one lamp parameter of an associated lamp, and for processing the at least one lamp parameter to monitor and control the associated lamp by outputting monitoring data and control information; and a transmit unit for transmitting the monitoring data, representing the at least one lamp parameter, from the processing and sensing unit.

These and other objects, advantages and features can also be achieved in accordance with the invention by a lamp monitoring and control unit comprising: a processing unit for processing at least one lamp parameter and outputting a relay control signal; a light sensor, coupled to the processing unit, for sensing an amount of ambient light, producing a light signal associated with the amount of ambient light, and outputting the light signal to the processing unit; a relay for switching a switched power line to a hot power line based upon the relay control signal from the processing unit; a voltage sensor, coupled to the processing unit, for sensing a switched voltage in the switched power line; a current sensor, coupled to the switched power line, for sensing a switched current in the switched power line; and a transmit unit for transmitting monitoring data, representing the at least one lamp parameter, from the processing unit.

These and other objects, advantages and features can also be achieved in accordance with the invention by a method for monitoring and controlling a lamp comprising the steps of: sensing at least one lamp parameter of an associated lamp; processing the at least one lamp parameter to produce monitoring data and control information; transmitting the monitoring data; and applying the control information.

A feature of the present invention is that the lamp monitoring and control unit may be coupled to the associated lamp via a standard three prong plug.

Another feature of the present invention is that the processing and sensing unit may include a relay for switching the switched power line to the hot power line.

Another feature of the present invention is that the processing and sensing unit may include a current sensor for sensing a switched current in the switched power line.

Another feature of the present invention is that the processing and sensing unit may include a voltage sensor for sensing a switched voltage in the switched power line.

Another feature of the present invention is that the transmit unit may include a transmitter and a modified directional discontinuity ring radiator, and the modified directional discontinuity ring radiator may include a plurality of loops for resonance at a desired frequency range.

Another feature of the present invention is that in accordance with an embodiment of the method, the step of processing may include providing an initial delay, a current stabilization delay, a relay settle delay, to prevent false triggering.

Another feature of the present invention is that in accordance with an embodiment of the method, the step of transmitting the monitoring data may include a pseudo-random reporting start time delay, reporting delta time, and frequency. The pseudo-random nature of these values may be based on the serial number of the lamp monitoring and control unit.

An advantage of the present invention is that it solves the problem of providing centralized monitoring and/or control of the street lamps in a geographical area.

Another advantage of the present invention is that by using the standard three prong plug of the current street lamps, it is easy to install in place of the millions of currently installed lamp control units.

An additional advantage of the present invention is that it provides for a new type of monitoring and control unit which allows centralized monitoring and/or control of units distributed over a large geographical area.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 8 shows an example frequency channel plan for a lamp monitoring and control unit, according to another embodiment of the invention.

DETAILED DESCRIPTION OF PREFERRED EMBODIMENTS

The preferred embodiments of a lamp monitoring and control unit (LMCU) and method, which allows centralized monitoring and/or control of street lamps, will now be described with reference to the accompanying figures. While the invention is described with reference to an LMCU, the invention is not limited to this application and can be used in any application which requires a monitoring and control unit for centralized monitoring and/or control of devices distributed over a large geographical area.

Figure 3:
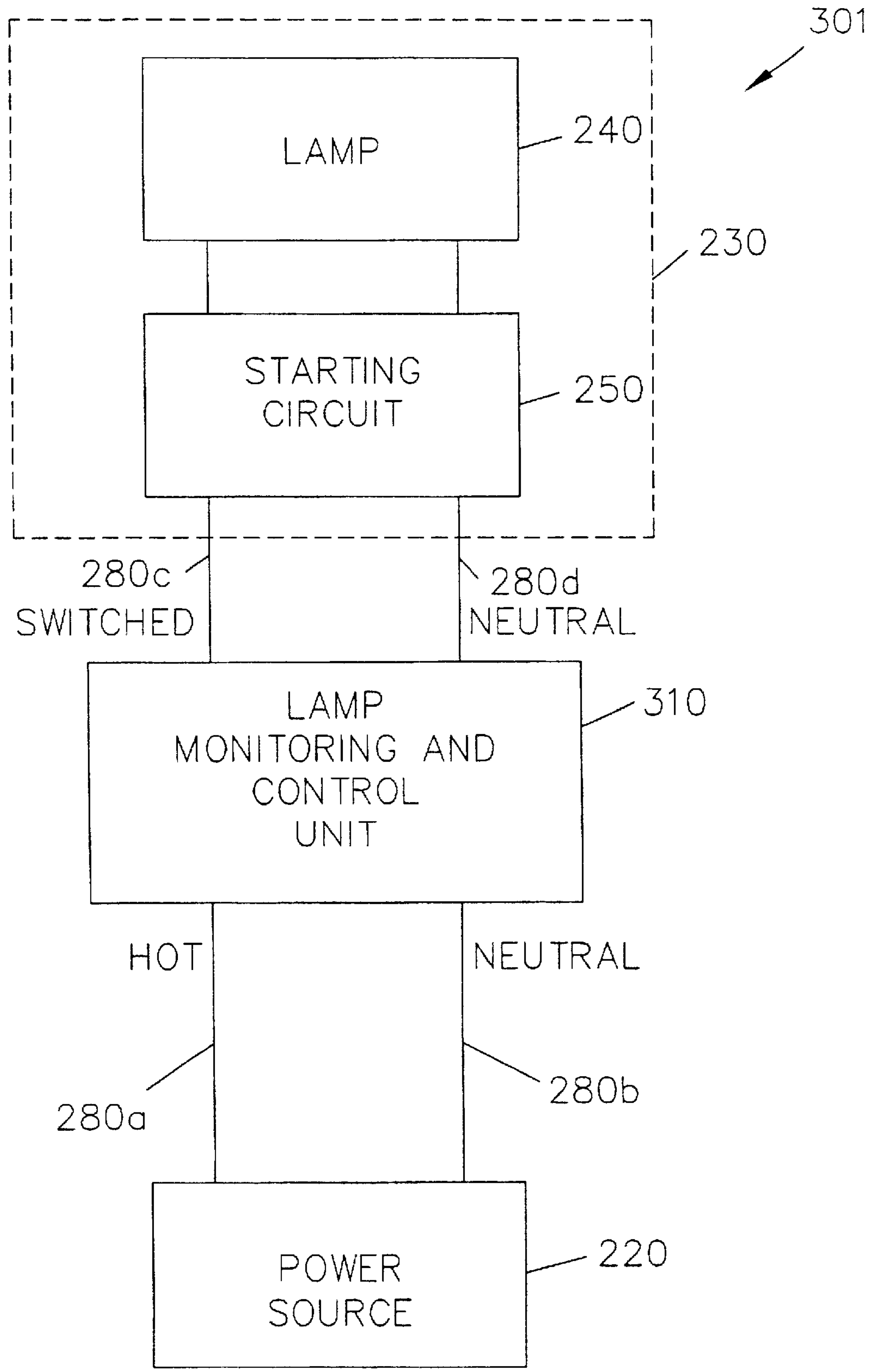
FIG. 3 shows a lamp arrangement, according to one embodiment of the invention, comprising a lamp monitoring and control unit situated between a power source and a lamp assembly.

FIG. 3 shows a lamp arrangement 301 which includes lamp monitoring and control unit 310, according to one embodiment of the invention. Lamp monitoring and control unit 310 is situated between a power source 220 and a lamp assembly 230. Lamp assembly 230 includes a lamp 240 and a starting circuit 250.

Power source 220 may be a standard 115 volt, 60 Hz source supplied by a power line. It is well known to those skilled in the art that a variety of alternatives are available for power source 220. In foreign countries, power source 220 may be a 220 volt, 50 Hz source from a power line. Additionally, power source 220 may be a DC voltage source or, in certain remote regions, it may be a battery which is charged by a solar reflector.

Recall that lamp sensor unit 210 included a light sensor 260 and a relay 270 which is used to control lamp assembly 230 by automatically switching the hot power 280*a* to a switched power line 280*c* depending on the amount of ambient light received by light sensor 260.

On the other hand, lamp monitoring and control unit 310 provides several functions including a monitoring function which is not provided by lamp sensor unit 210. Lamp monitoring and control unit 310 is electrically located between the external power supply 220 and starting circuit 250 of lamp assembly 230. From an electrical standpoint, there is a hot 280*a* with a neutral 280*b* electrical connection between power supply 220 and lamp monitoring and control unit 310. Additionally, there is a switched 280*c* and a neutral 280*d* electrical connection between lamp monitoring and control unit 310 and starting circuit 250 of lamp assembly 230.

From a physical standpoint, lamp monitoring and control unit 310 may use a standard three-prong plug to connect to the back of lamp assembly 230. The three prongs in the standard three-prong plug represent hot 280*a,* switched 280*c,* and neutral 280*b* and 280*d.* In other words, the neutral lines 280*b* and 280*d* are both connected to the same physical prong and share the same electrical potential.

Although use of a three-prong plug is recommended because of the substantial number of street lamps using this type of standard plug, it is well known to those skilled in the art that a variety of additional types of electrical connection may be used for the present invention. For example, a standard power terminal block or AMP power connector may be used.

Figure 4:
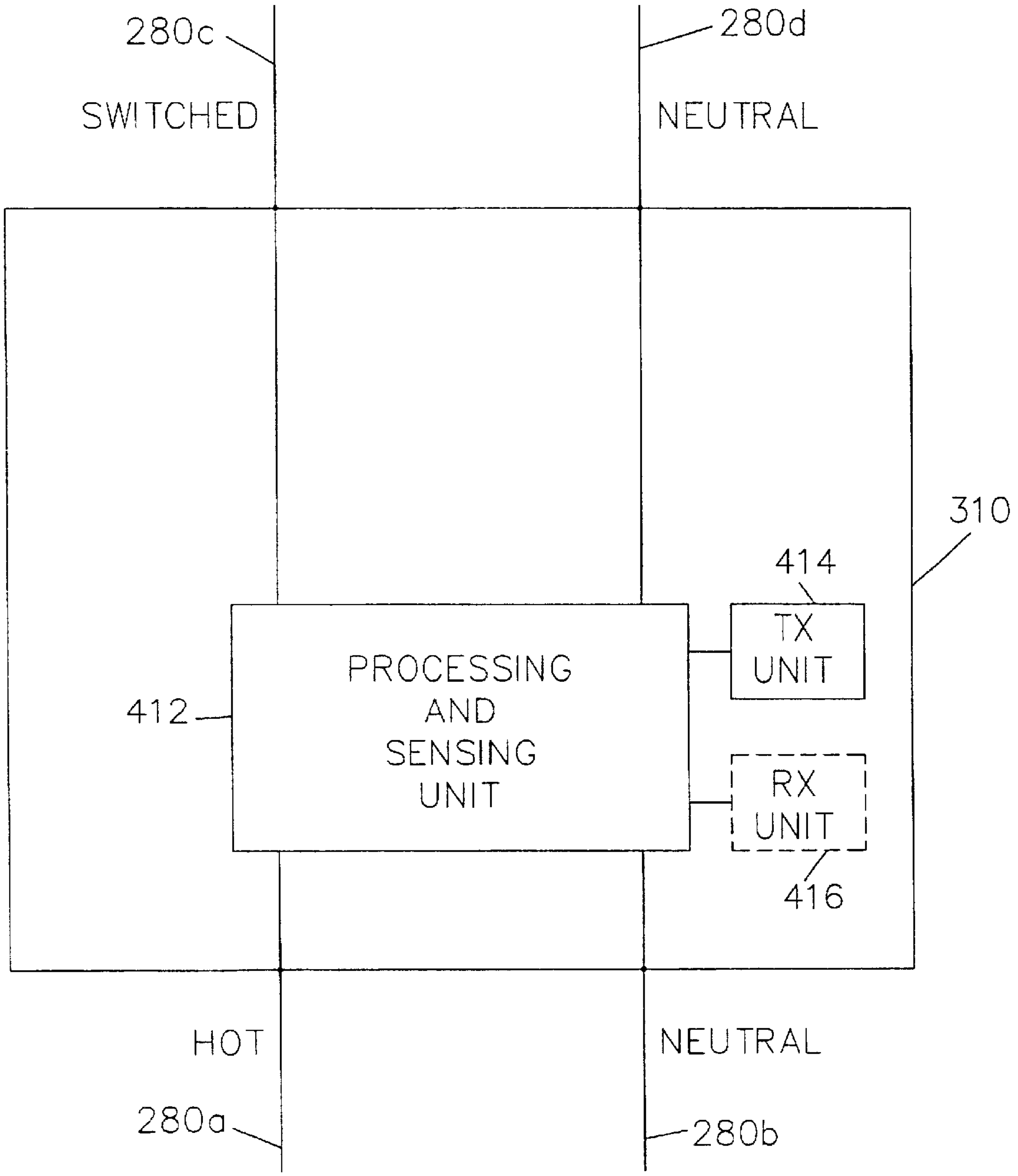
FIG. 4 shows a lamp monitoring and control unit, according to another embodiment of the invention, including a processing and sensing unit, a Tx unit, and an Rx unit.

FIG. 4 shows lamp monitoring and control unit 310, according to another embodiment of the invention. Lamp monitoring and control unit 310 includes a processing and sensing unit 412, a transmit (TX) unit 414, and an optional receive (RX) unit 416. Processing and sensing unit 412 is electrically connected to hot 280*a,* switched 280*c,* and neutral 280*b* and 280*d* electrical connections. Furthermore, processing and sensing unit 412 is connected to TX unit 414 and RX unit 416. In a standard application, TX unit 414 may be used to transmit monitoring data and RX unit 416 may be used to receive control information. For applications in which external control information is not required, RX unit 416 may be deleted from lamp monitoring and control unit 310.

Figure 1:
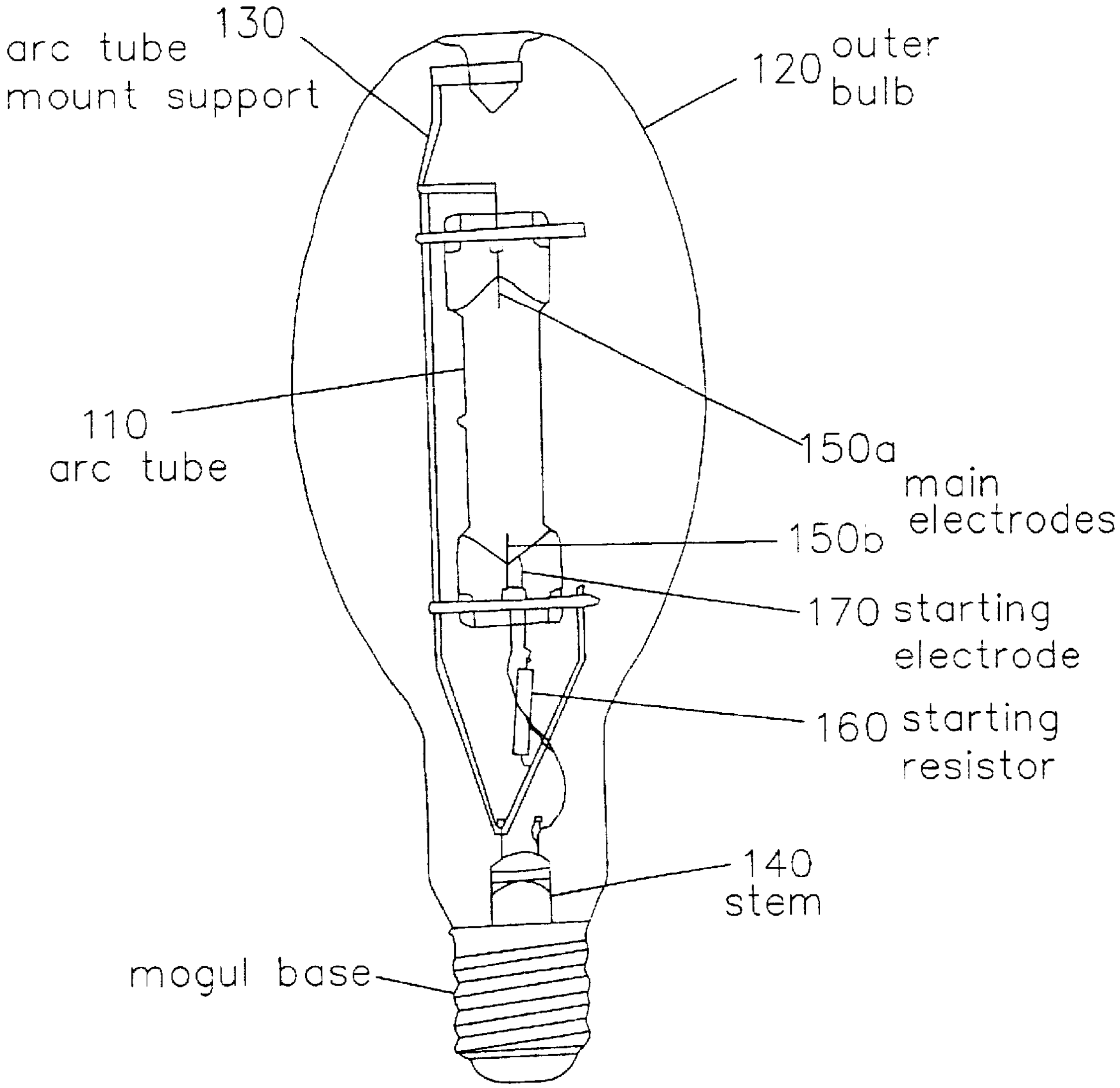
FIG. 1 shows the configuration of a typical mercury-vapor lamp.
Figure 2:
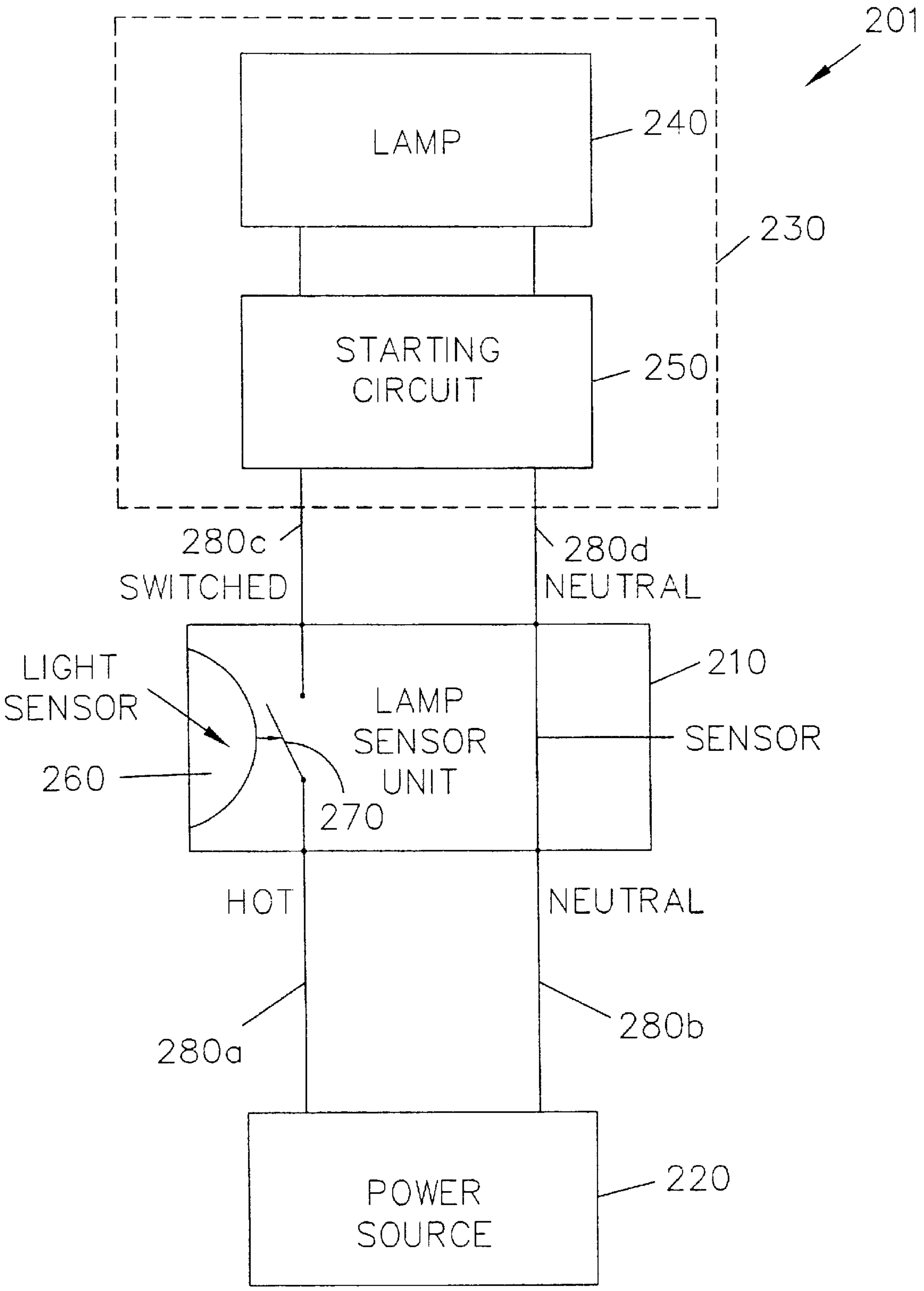
FIG. 2 shows a typical configuration of a lamp arrangement comprising a lamp sensor unit situated between a power source and a lamp assembly.
Figure 5:
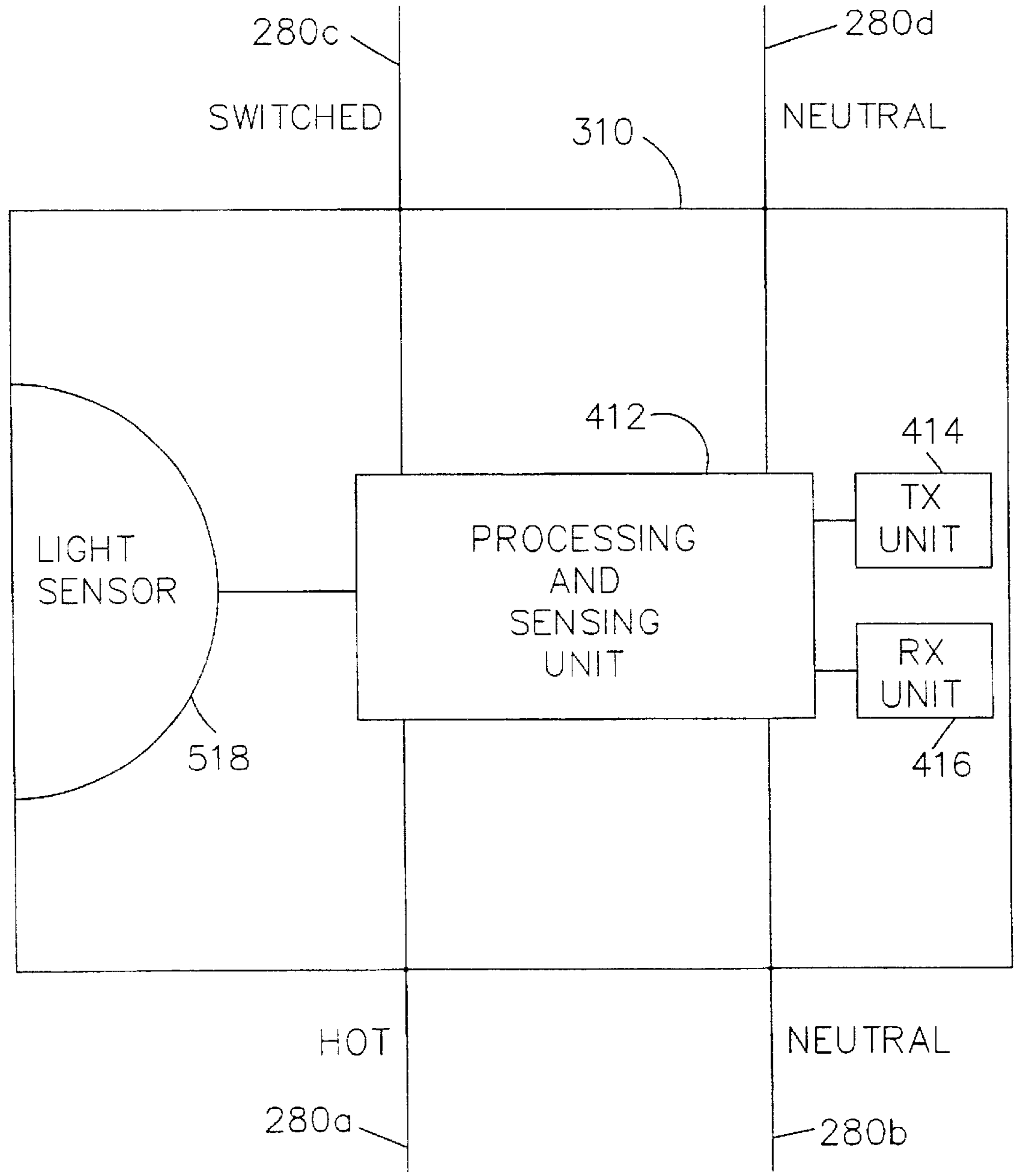
FIG. 5 shows a lamp monitoring and control unit, according to another embodiment of the invention, including a processing and sensing unit, a Tx unit, an Rx unit, and a light sensor.

FIG. 5 shows a lamp monitoring and control unit 310, according to another embodiment of the invention, with a configuration similar to that shown in FIG. 4. Here, however, lamp monitoring and control unit 310 of FIG. 5 further includes a light sensor 518, analogous to light sensor 216 of FIG. 2, which allows for some degree of local control. Light sensor 518 is coupled to processing and sensing unit 412 to provide information regarding the level of ambient light. Accordingly, processing and sensing unit 412 may receive control information either locally from light sensor 518 or remotely from RX unit 416.

Figure 6:
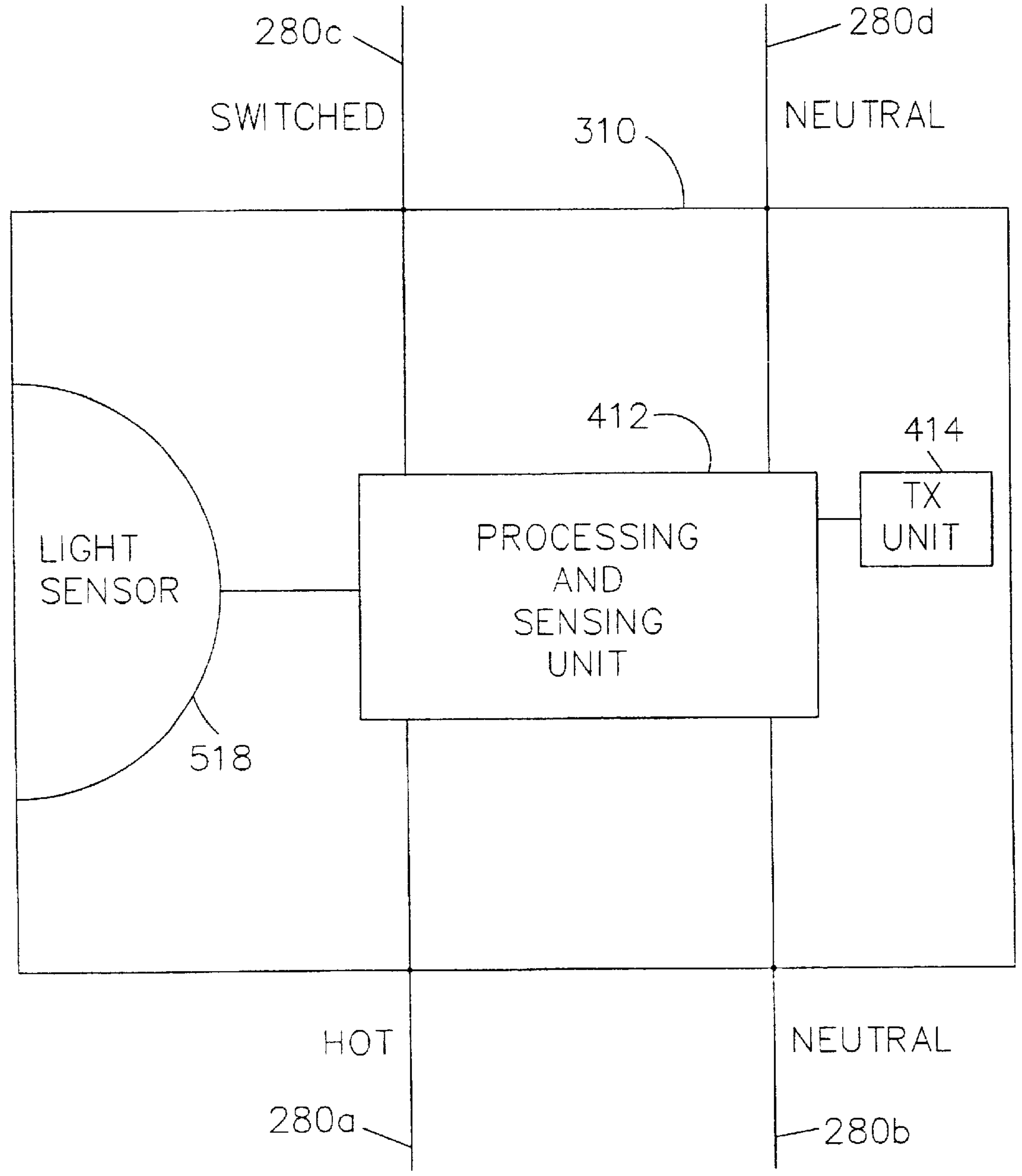
FIG. 6 shows a lamp monitoring and control unit, according to another embodiment of the invention, including a processing and sensing unit, a Tx unit, and a light sensor.

FIG. 6 shows another configuration for lamp monitoring control unit 310, according to another embodiment of the invention, but without RX unit 416. This embodiment of lamp monitoring and control unit 310 can be used in applications in which only local control information, for example from light sensor 518, is to be passed to processing and sensing unit 412. In other words, remote monitoring data may be received via TX unit 414 and local control information may be generated via light sensor 518.

Figure 7:
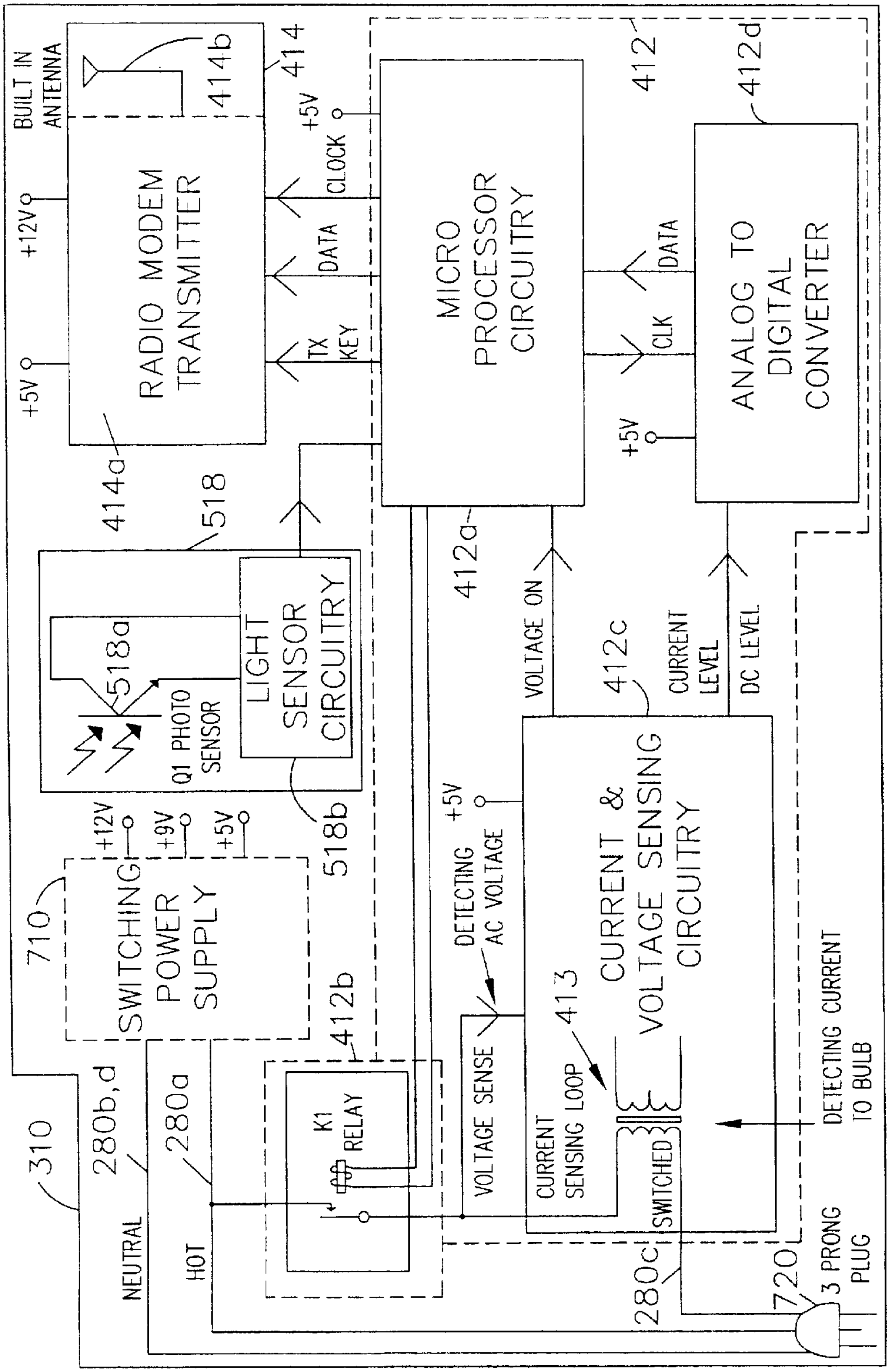
FIG. 7 shows a lamp monitoring and control unit, according to another embodiment of the invention, including a microprocessing unit, an A/D unit, a current sensing unit, a voltage sensing unit, a relay, a Tx unit, and a light sensor.

FIG. 7 shows a more detailed implementation of lamp monitoring and control unit 310 of FIG. 6, according to one embodiment of the invention.

FIG. 7 shows one embodiment of a lamp monitoring and control unit 310 with a three-prong plug 720 to provide hot 280*a,* neutral 280*b* and 280*d,* and switched 280*c* electrical connections. The hot 280*a* and neutral 280*b* and 280*d* electrical connections are connected to an optional switching power supply 710 in applications in which AC power is input and DC power is required to power the circuit components of lamp monitoring and control unit 310.

Light sensor 518 includes a photosensor 518*a* and associated light sensor circuitry 518*b.* TX unit 414 includes a radio modem transmitter 414*a* and a built-in antenna 414*b.* Processing and sensing unit 412 includes microprocessor circuitry 412*a,* a relay 412*b,* current and voltage sensing circuitry 412*c,* and an analog-to-digital converter 412*d.*

Microprocessor circuitry 412*a* includes any standard microprocessor/microcontroller such as the Intel 8751 or Motorola 68HC16. Additionally, in applications in which cost is an issue, microprocessor circuitry 412*a* may comprise a small, low cost processor with built-in memory such as the Microchip PIC 8 bit microcontroller. Furthermore, microprocessor circuitry 412*a* may be implemented by using a PAL, EPLD, FPGA, or ASIC device.

Microprocessor circuitry 412*a* receives and processes input signals and outputs control signals. For example, microprocessor circuitry 412*a* receives a light sensing signal from light sensor 518. This light sensing signal may either be a threshold indication signal, that is, providing a digital signal, or some form of analog signal.

Based upon the value of the light sensing signal, microprocessor circuitry 412*a* may alternatively or additionally execute software to output a relay control signal to a relay 412*a* which switches switched power line 280*c* to hot power line 280*a.*

Microprocessor circuitry 412*a* may also interface to other sensing circuitry. For example, the lamp monitoring and control unit 310 may include current and voltage sensing circuitry 412*c* which senses the voltage of the switched power line 280*c* and also senses the current flowing through the switched power line 280*c.* The voltage sensing operation may produce a voltage ON signal which is sent from the current and voltage sensing circuitry 412*c* to microprocessor circuitry 412*a.* This voltage ON signal can be of a threshold indication, that is, some form of digital signal, or it can be an analog signal.

Current and voltage sensing circuitry 412*c* can also output a current level signal indicative of the amount of current flowing through switched power line 280*c.* The current level signal can interface directly to microprocessor circuitry 412*a* or, alternatively, it can be coupled to microprocessing circuitry 412*a* through an analog-to-digital converter 412*b.* Microprocessor circuitry 412*a* can produce a CLOCK signal which is sent to analog-to-digital converter 412*d* and which is used to allow A/D data to pass from analog-to-digital converter 412*d* to microprocessor circuitry 412*a.*

Microprocessor circuitry 412*a* can also be coupled to radio modem transmitter 414*a* to allow monitoring data to be sent from lamp monitoring control unit 310.

The configuration shown in FIG. 7 is intended as an illustration of one way in which the present invention can be implemented. For example, analog-to-digital converter 412*b* may be combined into microprocessor circuitry 412*a* for some applications. Furthermore, the memory for microprocessor circuitry 412*a* may either be internal to the microprocessor circuitry or contained as an external EPROM, EEPROM, Flash RAM, dynamic RAM, or static RAM. Current and voltage sensor circuitry 412*c* may either be combined in one unit with shared components or separated into two separate units. Furthermore, the current sensing portion of current and voltage sensing circuitry 412*c* may include a current sensing transformer 413 and associated circuitry as shown in FIG. 7 or may be configured using different circuitry which also senses current.

The frequencies to be used by the TX unit 414 are selected by microprocessor circuitry 412*a*. There are a variety of ways that these frequencies can be organized and used, examples of which will be discussed below.

FIG. 8 shows an example of a frequency channel plan for lamp monitoring and control unit 310, according to one embodiment of the invention. In this example table, interactive video and data service (VDS) radio frequencies in the range of 218–219 MHz are shown. The IVDS channels in FIG. 8 are divided into two groups, Group A and Group B, with each group having nineteen channels spaced at 25 KHz steps. The first channel of the group A frequencies is located at 218.025 MHz and the first channel of the group B frequencies is located at 218.525 MHz.

The mapping between channel numbers and frequencies can either be performed in microprocessor circuitry 412*a* or TX unit 414. In other words the data signal sent to TX unit 414 from microprocessor circuitry 412*a* may either consist of channel numbers or frequency data. To transmit at these frequencies, TX unit 414 must have an associated antenna 414*b*.

Figure 9:
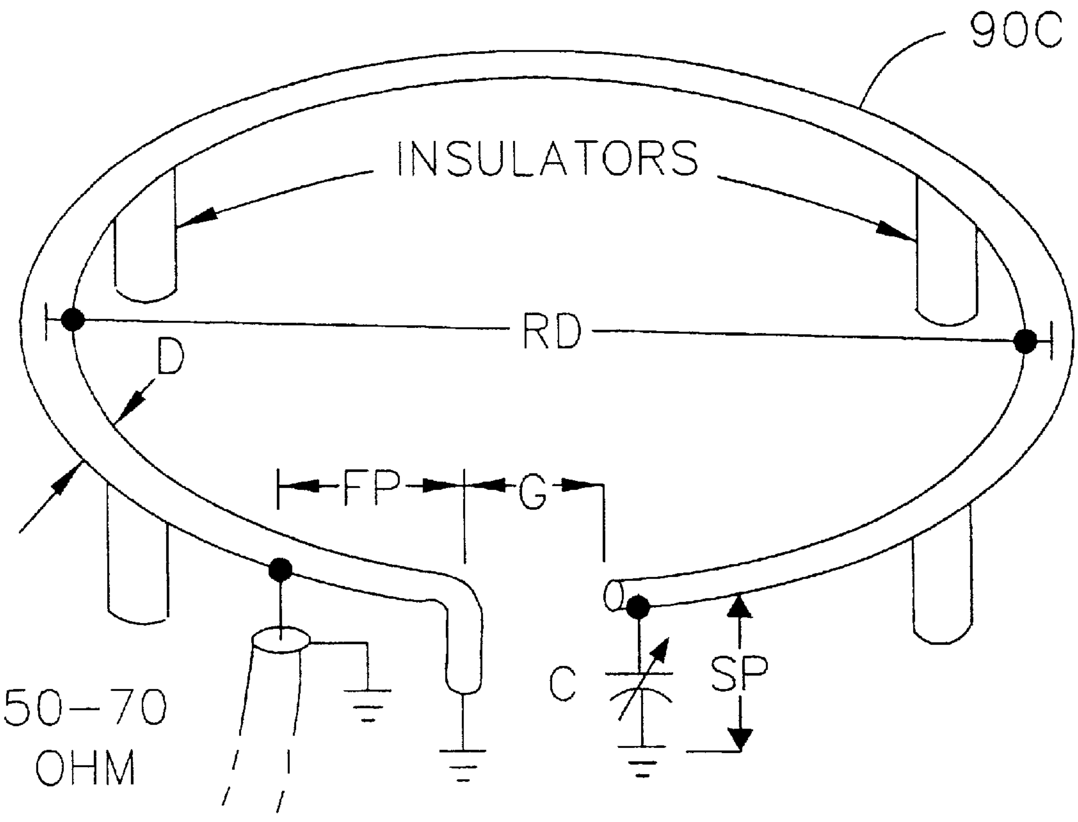
FIG. 9 shows a typical directional discontinuity ring radiator (DDRR) antenna.

FIG. 9 shows a typical directional discontinuity ring radiator (DDRR) antenna 900. DDRR antenna 900 is well known to those skilled in the art, and detailed description of the operation and use of this antenna can be found in the ARRL Handbook, the appropriate sections of which are incorporated by reference. The problem with using DDRR antenna 900 in applications such as lamp monitoring and control unit 310 is that the antenna gain in certain frequency ranges, such as the IVDS frequency range, is not large enough.

Figure 10:
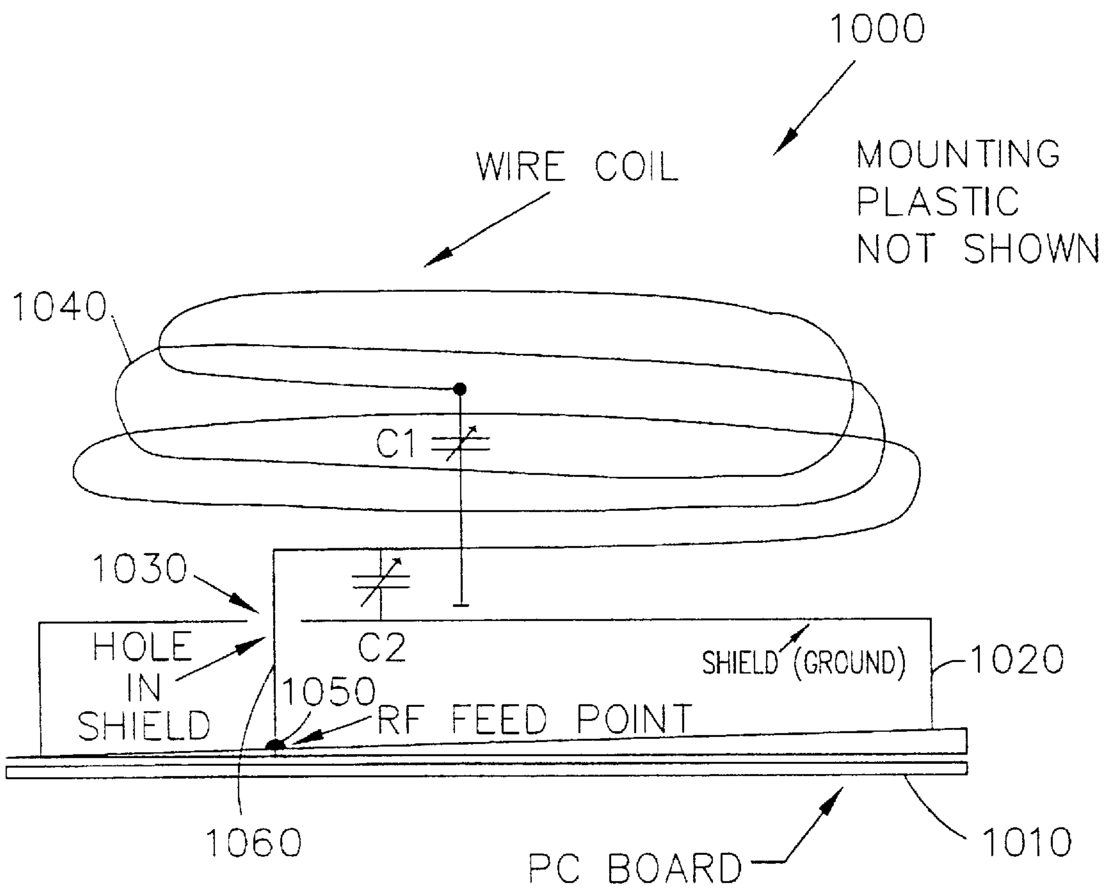
FIG. 10 shows a modified DDRR antenna, according to another embodiment of the invention.

FIG. 10 shows a modified DDRR antenna 1000, according to a further embodiment of the invention. Modified DDRR antenna 1000 has multiple loops which allow the antenna to resonate at particular frequencies. For example, if typical DDRR antenna 900 with approximately a 4" diameter is modified to include three to four loops, the gain in the IVDS frequency range is greatly increased. This increase translates into a better transmit link margin so that a lower power transmitter may be used. The exact number of additional loops and spacing for modified DDRR antenna 1000 depends on the frequency range selected.

Furthermore, if lamp monitoring and control unit 310 includes RX unit 416, as shown in FIG. 4, modified DDRR antenna 1000 can be shared by TX unit 414 and RX unit 416. Alternatively, RX unit 416 and TX unit 414 may use separate antennas.

Figure 11A:
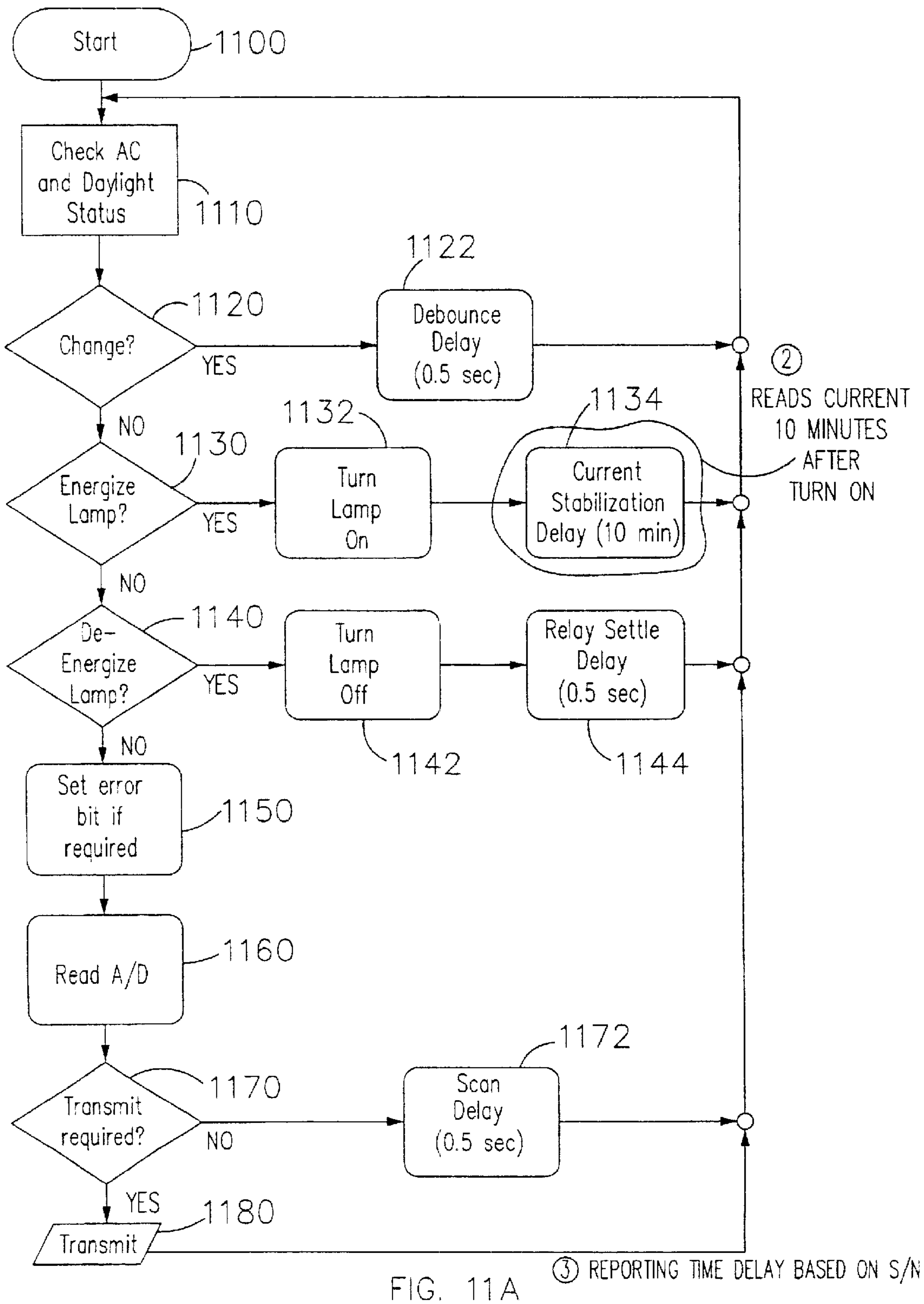
FIGS. 11A–D show methods for one implementation of logic for a lamp monitoring and control unit, according to another embodiment of the invention.
Figure 11B:
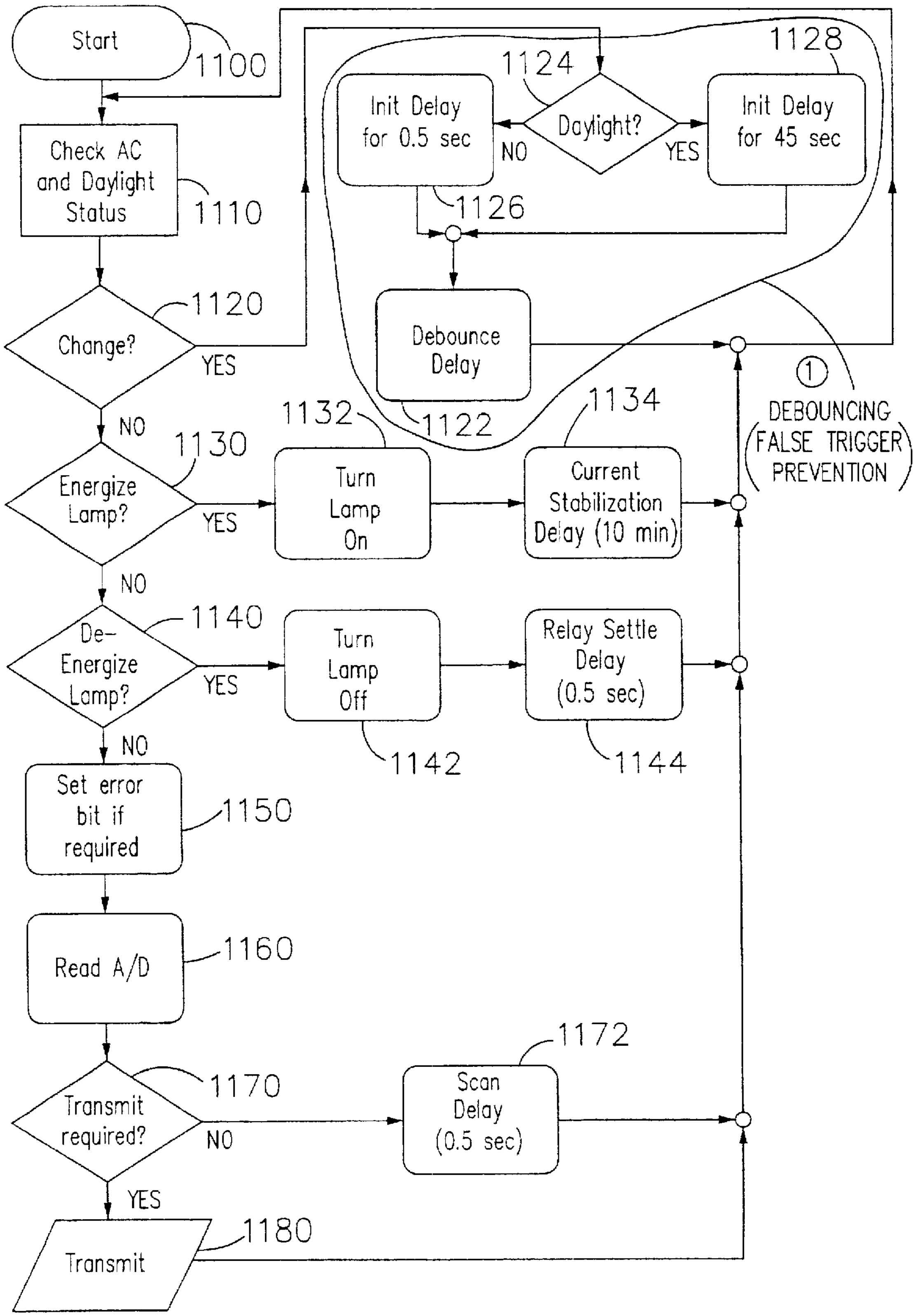
Figure 11C:
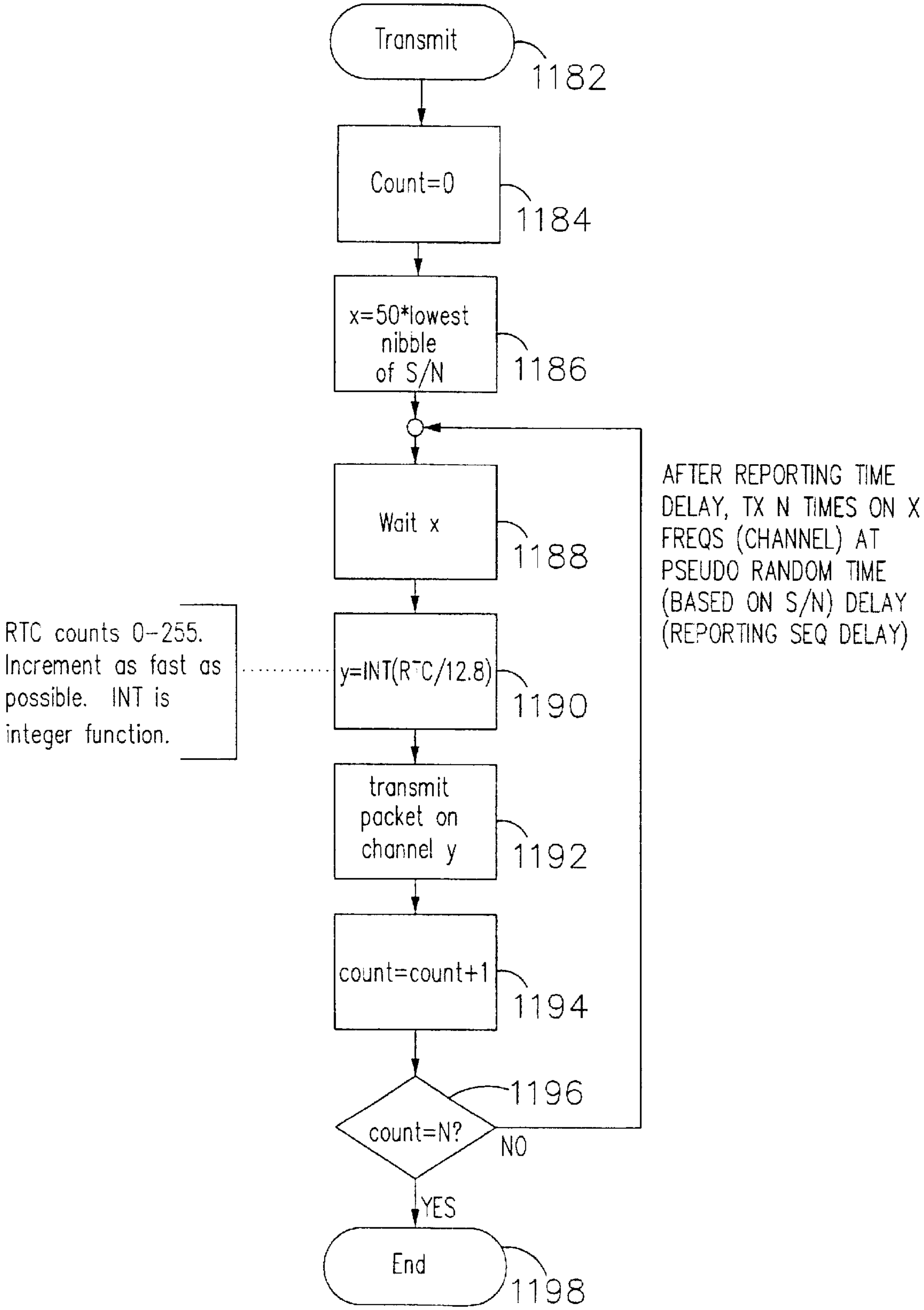
Figure 11D:
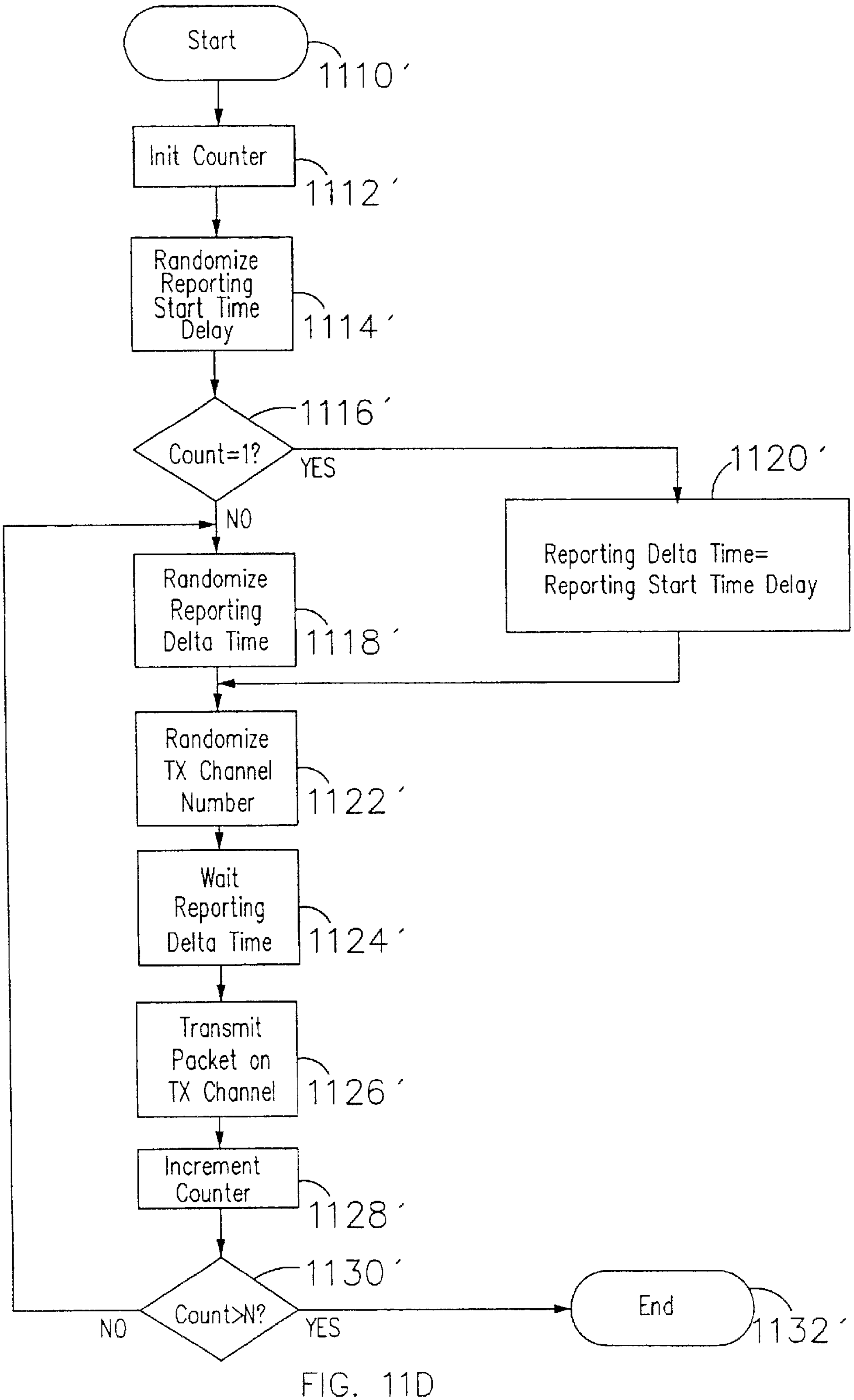
Figure 11E:
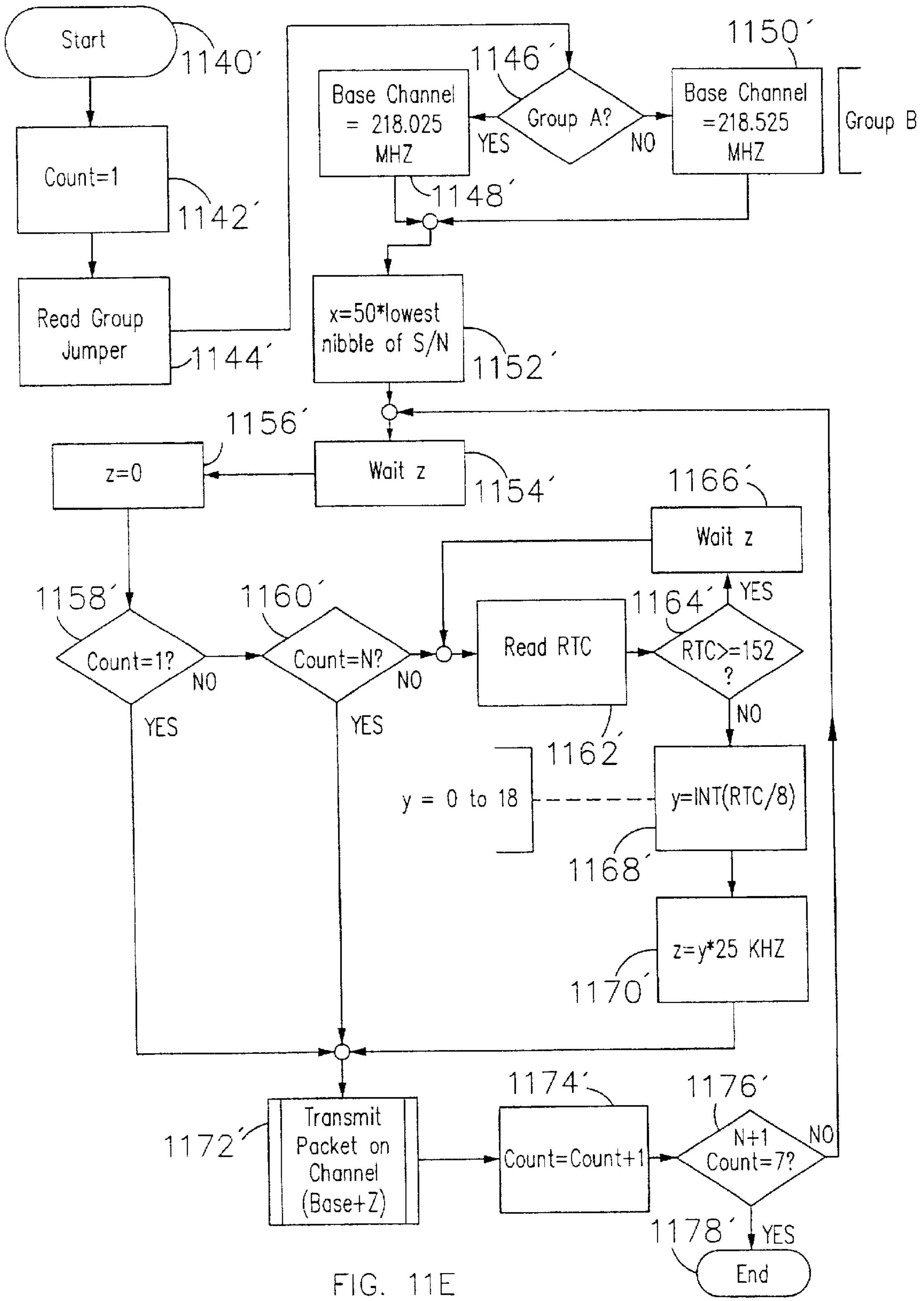

FIGS. 11A–C show methods for implementation of logic for lamp monitoring and control unit 310, according to a further embodiment of the invention. These methods may be implemented in a variety of ways, including software in microprocessor circuitry 412*a* or customized logic chips.

FIG. 11A shows one method for energizing and de-energizing a street lamp and transmitting associated monitoring data. The method of FIG. 11A shows a single transmission for each control event. The method begins with a start block 1100 and proceeds to step 1110 which involves checking AC and Daylight Status. The Check AC and Daylight Status step 1110 is used to check for conditions where the AC power and/or the Daylight Status have changed. If a change does occur, the method proceeds to the step 1120 which is a decision block based on the change.

If a change occurred, step 1120 proceeds to a Debounce Delay step 1122 which involves inserting a Debounce Delay. For example, the Debounce Delay may be 0.5 seconds. After Debounce Delay step 1122, the method leads back to Check AC and Daylight Status step 1110.

If no change occurred, step 1120 proceeds to step 1130 which is a decision block to determine whether the lamp should be energized. If the lamp should be energized, then the method proceeds to step 1132 which turns the lamp on. After step 1132 when the lamp is turned on, the method proceeds to step 1134 which involves Current Stabilization Delay to allow the current in the street lamp to stabilize. The amount of delay for current stabilization depends upon the type of lamp used. However, for a typical vapor lamp a ten minute stabilization delay is appropriate. After step 1134, the method leads back to step 1110 which checks AC and Daylight Status.

Returning to step 1130, if the lamp is not to be energized, then the method proceeds to step 1140 which is a decision block to check to deenergize the lamp. If the lamp is to be deenergized, the method proceeds to step 1142 which involves turning the Lamp Off. After the lamp is turned off, the method proceeds to step 1144 in which the relay is allowed a Settle Delay time. The Settle Delay time is dependent upon the particular relay used and may be, for example, set to 0.5 seconds. After step 1144, the method returns to step 1110 to check the AC and Daylight Status.

Returning to step 1140, if the lamp is not to be deenergized, the method proceeds to step 1150 in which an error bit is set, if required and proceeds to step 1160 in which an A/D is read. For example, the A/D may be the analog-to-digital converter 412*d* for reading the current level as shown in FIG. 7.

The method then proceeds from step 1160 to step 1170 which checks to see if a transmit is required. If no transmit is required, the method proceeds to step 1172 in which a Scan Delay is executed. The Scan Delay depends upon the circuitry used and, for example, may be 0.5 seconds. After step 1172, the method returns to step 1110 which checks AC and Daylight Status.

Returning to step 1170, if a transmit is required, then the method proceeds to step 1180 which performs a transmit operation. After the transmit operation of step 1180 is completed, the method then returns to step 1110 which checks AC and Daylight Status.

FIG. 11B is analogous to FIG. 11A with one modification. This modification occurs after step 1120. If a change has occurred, rather than simply executing step 1122, the Debounce Delay, the method performs a further step 1124 which involves checking whether daylight has occurred. If daylight has not occurred, then the method proceeds to step 1126 which executes an Initial Delay. This initial delay may be, for example, 0.5 seconds. After step 1126, the method proceeds to step 1122 and follows the same method as shown in FIG. 11A.

Returning to step 1124 which involves checking whether daylight has occurred, if daylight has occurred, the method proceeds to step 1128 which executes an Initial Delay. The Initial Delay associated with step 1128 should be a significantly larger value than the Initial Delay associated with step 1126. For example, an Initial Delay of 45 seconds may be used. The Initial Delay of step 1128 is used to prevent a false triggering which deenergizes the lamp. In actual practice, this extended delay can become very important because if the lamp is inadvertently deenergized too soon, it requires a substantial amount of time to reenergize the lamp (for example, ten minutes). After step 1128, the method proceeds to step 1122 which executes a Debounce Delay and then returns to step 1110 as shown in FIGS. 11A and 11B.

FIG. 11C shows a method for transmitting monitoring data multiple times in a lamp monitoring and control unit, according to a further embodiment of the invention. This method is particularly important in applications in which lamp monitoring and control unit 310 does not have a RX unit 416 for receiving acknowledgements of transmissions.

The method begins with a transmit start block 1182 and proceeds to step 1184 which involves initializing a count value, i.e. setting the count value to zero. Step 1184 proceeds to step 1186 which involves setting a variable x to a value associated with a serial number of lamp monitoring and control unit 310. For example, variable x may be set to 50 times the lowest nibble of the serial number.

Step 1186 proceeds to step 1188 which involves waiting a reporting start time delay associated with the value x. The reporting start time is the amount of delay time before the first transmission. For example, this delay time may be set to x msecs where x is an integer between 1 and 1000 or more.

Step 1188 proceeds to step 1190 in which a variable y representing a channel number is set. For example, y may be set to the integer value of RTC/12.8, where RTC represents a real time clock counting from 0–255 as fast as possible. The RTC may be included in microprocessing circuitry 412*a*.

Step 1190 proceeds to step 1192 in which a packet is transmitted on channel y. Step 1192 proceeds to step 1194 in which the count value is incremented. Step 1194 proceeds to step 1196 which is a decision block to determine if the count value equals an upper limit N.

If the count is not equal to N, step 1196 returns to step 1188 and waits another delay time associated with variable x. This delay time is the reporting delta time since it represents the time difference between two consecutive reporting events.

If the count is equal to N, step 1196 proceeds to step 1198 which is an end block. The value for N must be determined based on the specific application. Increasing the value of N decreases the probability of a unsuccessful transmission since the same data is being sent multiple times and the probability of all of the packets being lost decreases as N increases. However, increasing the value of N increases the amount of traffic which may become an issue in a lamp monitoring and control system with a plurality of lamp monitoring and control units.

Although the above figures show numerous embodiments of the invention, it is well known to those skilled in the art that numerous modifications can be implemented.

For example, FIG. 4 shows a light monitoring and control unit 310 in which there is no light sensor but rather an RX unit 416 for receiving control information. Light monitoring and control unit 310 may be used in an environment in which a centralized control system is preferred. For example, instead of having a decentralized light sensor at every location, light monitoring and control unit 310 of FIG. 4 allows for a centralized control mechanism. For example, RX unit 416 could receive centralized energize/deenergize signals which are sent to all of the street lamp assemblies in a particular geographic region.

As another alternative, if lamp monitoring and control unit 310 of FIG. 4 contains no RX unit 416, the control functionality can be built directly in the processing and sensing unit 412. For example, processing and sensing unit 412 may contain a table with a listing of sunrise and sunset times for a yearly cycle. The sunrise and sunset times could be used to energize and deenergize the lamp without the need for either RX unit 416 or light sensor 518.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A lamp monitoring and control unit, comprising:

a processing and sensing unit to sense at least one lamp parameter of an associated lamp, and to process the at least one lamp parameter to monitor and control the associated lamp by outputting monitoring data and control information; and a wireless transmit unit coupled to transmit the monitoring data, representing said at least one lamp parameter, from said processing and sensing unit.

2. The lamp monitoring and control unit of claim 1, further comprising:

a light sensor, coupled to said processing and sensing unit, for sensing an amount of ambient light, producing a light signal associated with the amount of ambient light, and outputting the light signal to said processing and sensing unit.

3. The lamp monitoring and control unit of claim 2, wherein the light signal from said light sensor is a threshold indication signal.

4. The lamp monitoring and control unit of claim 2, wherein said light sensor includes a photo sensor and associated light sensor circuitry.

5. The lamp monitoring and control unit of claim 1, wherein said processing and sensing unit receives a hot power line and a neutral power line and outputs a switched power line.

6. The lamp monitoring and control unit of claim 5, wherein the lamp monitoring and control unit is coupled to the associated lamp via a standard three prong plug which carries the hot power line, the switched power line, and the neutral power line.

7. The lamp monitoring and control unit of claim 5, wherein the processing and sensing unit includes a relay for switching the switched power line to the hot power line.

8. The lamp monitoring and control unit of claim 5, wherein the processing and sensing unit includes a current sensor for sensing a switched current in the switched power line.

9. The lamp monitoring and control unit of claim 8, wherein the current sensor includes a transformer and associated circuitry to produce a DC voltage associated with the switched current.

10. The lamp monitoring and control unit of claim 8, wherein the processing and sensing unit includes an A/D converter for converting a DC voltage associated with the switched current to a switched current data signal.

11. The lamp monitoring and control unit of claim 5, wherein the processing and sensing unit includes a voltage sensor for sensing a switched voltage in the switched power line.

12. The lamp monitoring and control unit of claim 5, further comprising a power supply for receiving the hot power line and the neutral power line and for outputting at least one internal voltage.

13. The lamp monitoring and control unit of claim 1, wherein the monitoring data is transmitted to a centralized base station.

14. The lamp monitoring and control unit of claim 1, wherein said transmit unit includes a transmitter and a modified directional discontinuity ring radiator.

15. The lamp monitoring and control unit of claim 14, wherein said modified directional discontinuity ring radiator includes a plurality of loops for resonance at a desired frequency range.

16. The lamp monitoring and control unit of claim 1, wherein said transmit unit transmits signals in a frequency range of 218–219 MHz.

17. The lamp monitoring and control unit of claim 1, wherein the associated lamp is a street lamp.

18. The lamp monitoring and control unit of claim 1, wherein the associated lamp is a mercury-vapor lamp.

19. A lamp monitoring and control unit, comprising:

a processing unit for processing at least one lamp parameter and outputting a relay control signal;

a light sensor, coupled to said processing unit, for sensing an amount of ambient light, producing a light signal associated with the amount of ambient light, and outputting the light signal to said processing unit;

a relay for switching a switched power line to a hot power line based upon the relay control signal from said processing unit;

a voltage sensor, coupled to said processing unit, for sensing a switched voltage in the switched power line;

a current sensor, coupled to the switched power line, for sensing a switched current in the switched power line; and a wireless transmit unit for spontaneously transmitting monitoring data, representing said at least one lamp parameter, from said processing unit.

20. The lamp monitoring and control unit of claim 19, further comprising a lamp assembly for receiving the switched power line.

21. The lamp monitoring and control unit of claim 20, wherein said lamp assembly includes a lamp and a starting circuit.

22. The lamp monitoring and control unit of claim 19, further comprising an A/D converter, coupled between said current sensor and said processing unit, for converting a DC voltage from said current sensor, associated with the switched current, to a switched current data signal.

23. The lamp monitoring and control unit of claim 19, wherein said current sensor includes a transformer and associated circuitry to produce a DC voltage associated with the switched current.

24. A method for monitoring and controlling a lamp comprising:

sensing at least one lamp parameter of the lamp;

processing the at least one lamp parameter to produce monitoring data and control information;

spontaneously transmitting the monitoring data in free space; and applying the control information to the lamp.

25. The method for monitoring and controlling a lamp of claim 24, wherein said step of sensing includes sensing an amount of ambient light and said step of processing includes producing a light signal associated with the amount of ambient light.

26. The method for monitoring and controlling a lamp of claim 24, wherein said step of sensing includes sensing an electrical current.

27. The method for monitoring and controlling a lamp of claim 26, wherein said step of sensing an electrical current includes outputting a DC voltage representative of the current and converting the DC voltage from analog to digital.

28. The method for monitoring and controlling a lamp of claim 24, wherein said step of sensing includes sensing an electrical voltage.

29. The method for monitoring and controlling a lamp of claim 28, wherein said step of sensing an electrical voltage includes comparing the electrical voltage to a threshold voltage value.

30. The method for monitoring and controlling a lamp of claim 24, wherein said step of processing includes providing an initial delay to prevent false triggering.

31. The method for monitoring and controlling a lamp of claim 30, wherein the initial delay for a sunrise threshold condition is at least 45 seconds.

32. The method for monitoring and controlling a lamp of claim 24, wherein said step of applying control information includes providing a current stabilization delay when outputting a lamp turn-on signal.

33. The method for monitoring and controlling a lamp of claim 32, wherein the current stabilization delay is at least 10 minutes.

34. The method for monitoring and controlling a lamp of claim 24, wherein said step of applying control information includes providing a relay settle delay when outputting a lamp turn-off signal.

35. The method for monitoring and controlling a lamp of claim 34, wherein the relay settle delay is at least 0.5 seconds.

36. The method for monitoring and controlling a lamp of claim 24, wherein said step of transmitting the monitoring data includes a reporting start time delay.

37. The method for monitoring and controlling a lamp of claim 36, wherein the reporting start time delay is pseudo-random.

38. The method for monitoring and controlling a lamp of claim 36, wherein the reporting start time delay is based on a serial number.

39. The lamp monitoring and control unit of claim 1, wherein the lamp monitoring and control unit is coupled to the associated lamp via a standard three prong plug.

40. The lamp monitoring and control unit of claim 1, wherein said transmit unit has an range of more than 30 meters.

41. A lamp monitoring and control unit adapted to be coupled to an associated lamp, comprising:

a processing and sensing unit which senses at least one lamp parameter of the associated lamp, and processes the at least one lamp parameter to monitor and control the associated lamp by outputting monitoring data and control information; and a wireless transmitter which spontaneously broadcasts the monitoring data, representing said at least one lamp parameter, from said processing and sensing unit.

42. The lamp monitoring and control unit of claim 41, wherein said transmit unit broadcasts the monitoring data to a central geographic location.

43. The lamp monitoring and control unit of claim 41, wherein the processing and sensing unit includes a current sensor for sensing current in the associated lamp.

44. The lamp monitoring and control unit of claim 41, wherein the processing and sensing unit includes a current sensor for sensing current in the associated lamp.

45. The lamp monitoring and control unit of claim 1, wherein the wireless transmit unit transmits the monitoring data in free space.

46. The lamp monitoring and control unit of claim 1, wherein the wireless transmit unit further comprises a directional antenna to direct the transmission of the monitoring data.

47. The lamp monitoring and control unit of claim 1, wherein the wireless transmit unit is configured for point-to-point communication.

48. The lamp monitoring and control unit of claim 1, wherein the wireless transmit unit comprises a radio frequency (RF) transmitter.

49. The lamp monitoring and control unit of claim 1, wherein the control information comprises a request to send signal.

50. The lamp monitoring and control unit of claim 1, wherein the request to send signal is transmitted by the wireless transmit unit prior to transmitting the monitoring data to prevent a data collision.

51. The lamp monitoring and control unit of claim 19, wherein the wireless transmit unit transmits the monitoring data in free space.

52. The lamp monitoring and control unit of claim 19, wherein the wireless transmit unit further comprises a directional antenna to direct the transmission of the monitoring data.

53. The lamp monitoring and control unit of claim 19, wherein the wireless transmit unit is configured for point-to-point communication.

54. The lamp monitoring and control unit of claim 19, wherein the wireless transmit unit comprises a radio frequency (RF) transmitter.

55. The method of claim 24, wherein the step of spontaneously transmitting the monitoring data in free space comprises a point-to-point transmission.

56. The method of claim 24, wherein the step of spontaneously transmitting the monitoring data in free space comprises a wireless transmission of the monitoring data.

57. The method of claim 24, wherein a wireless transmitter is used to spontaneously transmit the monitoring data.

58. The method of claim 57, wherein the wireless transmitter comprises a radio frequency transmitter.

59. The method of claim 24, further comprising transmitting the control information, wherein the control information comprises a request to send signal to prevent a data collision.

60. The lamp monitoring and control unit of claim 41, wherein the wireless transmitter transmits the monitoring data in free space.

61. The lamp monitoring and control unit of claim 41, wherein the broadcast comprises a point to point transmission.

* * * * *